UNITED STATES PATENT OFFICE.

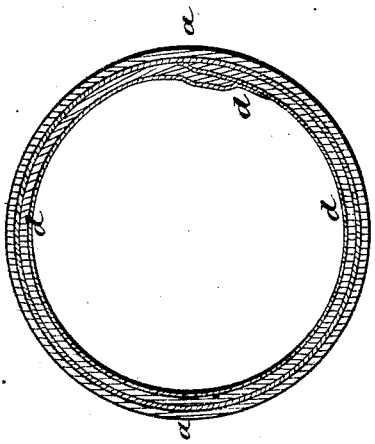
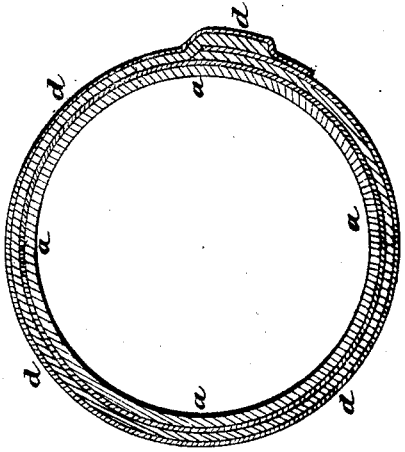
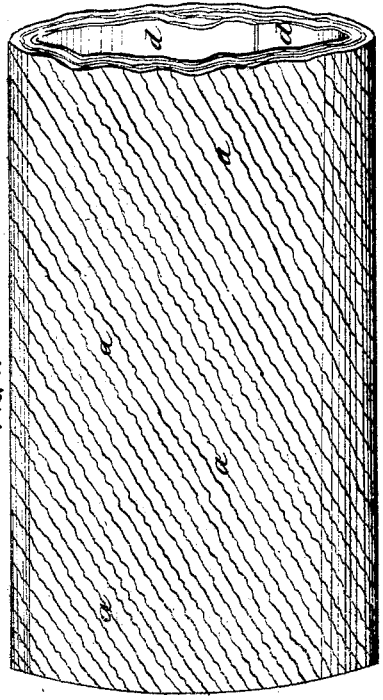
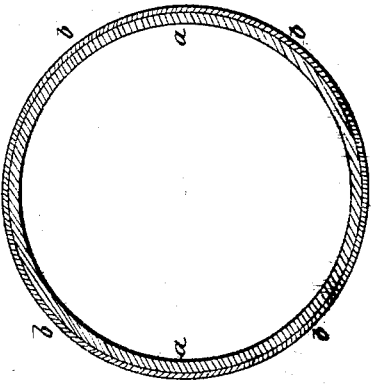

HENRY A. ALDEN, OF MATTEAWAN, NEW YORK, ASSIGNOR TO NEW YORK RUBBER COMPANY.

FLEXIBLE HOSE-TUBING.

Specification of Letters Patent No. 28,432, dated May 22, 1860.

*To all whom it may concern:*

Be it known that I, HENRY A. ALDEN, of Matteawan, in the county of Dutchess and State of New York, have invented a new and useful Improvement in Flexible Tubing or Hose; and I do hereby declare that the following, taken in connection with the accompanying drawing, is such a full and clear description thereof as that others skilled in the manufacture of other descriptions of flexible tubing or hose will be enabled to construct and use this my improvement.

My invention consists in the production of a new article of manufacture, forming a flexible tubing or hose applicable to the passage of fluids for fire engines and other purposes, in which a waterproof lined lapped flexible tube has combined with it in a novel manner a waterproof lined or coated external woven flexible tube substantially as hereinafter described. In the accompanying drawing, Figure 1, represents an exterior longitudinal view of portion of a hose constructed according to my improvement; and Fig. 2, a transverse section thereof; Fig. 3, shows a transverse section of the woven flexible tubing portion, preparatory to its having combined with it the lapped flexible tube and before turning of the whole, when so combined, inside out. Fig. 4, illustrates a portion of the woven flexible strip with its coating or lining, out of which the lapped tube is formed; and Fig. 5, shows a transverse section of the two tubes as combined before turning.

I first take a flexible tube or hose (*a*) of cotton, hemp, or other fibrous material woven in any well known or suitable manner and coat the exterior surface of such close or woven flexible tube with guttapercha, india-rubber or their compounds or equivalents, either with or without sulfur, and which may be applied in a sheet or sheets or otherwise, to form a covering (*b*) to said tube that shall be impervious to moisture or water. I next take a strip (*c*) of similar or any other suitable woven material and of any required length and of a breadth corresponding to or a little more than one or more times the circumferential measurement (according to strength wanted) of the water proof coated woven tube, and, covering this strip on its one or both sides or faces with any suitable cement, india rubber or gutta-percha covering (*d*) as in the case of the woven tube, to give it a water proof character. I lay the gutta-percha coated woven tube on the flexible woven strip (*c*) or so apply the latter to the former, and wrap the flexible strip around one or more times and cement it to or on the exterior surface of the woven tube and form a close or lapped joint at or near the junction of the edges of the strip, as represented in Fig. 5 of the drawing, or in any other suitable manner of establishing a close joint. The lapped and woven tube being thus combined making the latter for the time being the interior tube, the whole is afterward turned inside out, whereby the woven tube is made the external one and the lapped tube with its waterproof coating or lining the interior one. This not only gives a smooth finish or surface to the interior of the compound tube for the easy passage of fluids therethrough, but the two or more tubes, with their two or more waterproof coverings separated by the flexible material of the lapped tube, gives any desired strength and prefect protection against leakage as any flow or puncture or hole made in the inner or interior exposed lining (*d*) would be covered by the water proof coating or lining (*b*) of the woven tube, and this latter coating or lining have interposed between it and the other lining (*d*) the flexible material of the lapped tube and the further protection on the outside of the flexible material of the woven tube. But this is not all, for it will be seen that in thus combining a lapped with a woven tube, a firmness and compactness is given to the whole by the close or woven tube acting as a sheath to the lapped tube and this in a tight or more advantageous manner by reason of the stretch, which is put upon the woven tube in turning it after its union with the lapped tube from an interior position or lesser diameter to an exterior position or larger diameter, and which serves most effectually to bind the intermediate coating or lining (*b*) on and unite it with the woven material of the lapped tube.

I claim therefore, as a new and useful article of manufacture—

A compound flexible tubing or hose formed of close or woven and lapped tubes, with waterproof coatings or linings and combined as described.

In testimony whereof I have signed my name to this specification before two subscribing witnesses.

HENRY A. ALDEN.

Witnesses:
JOHN MACKENZIE,
FRANCIS E. OLIVER.